Aug. 27, 1940.  H. D. HARPER  2,212,661
BEARING LUBRICATION SYSTEM
Filed Dec. 10, 1937
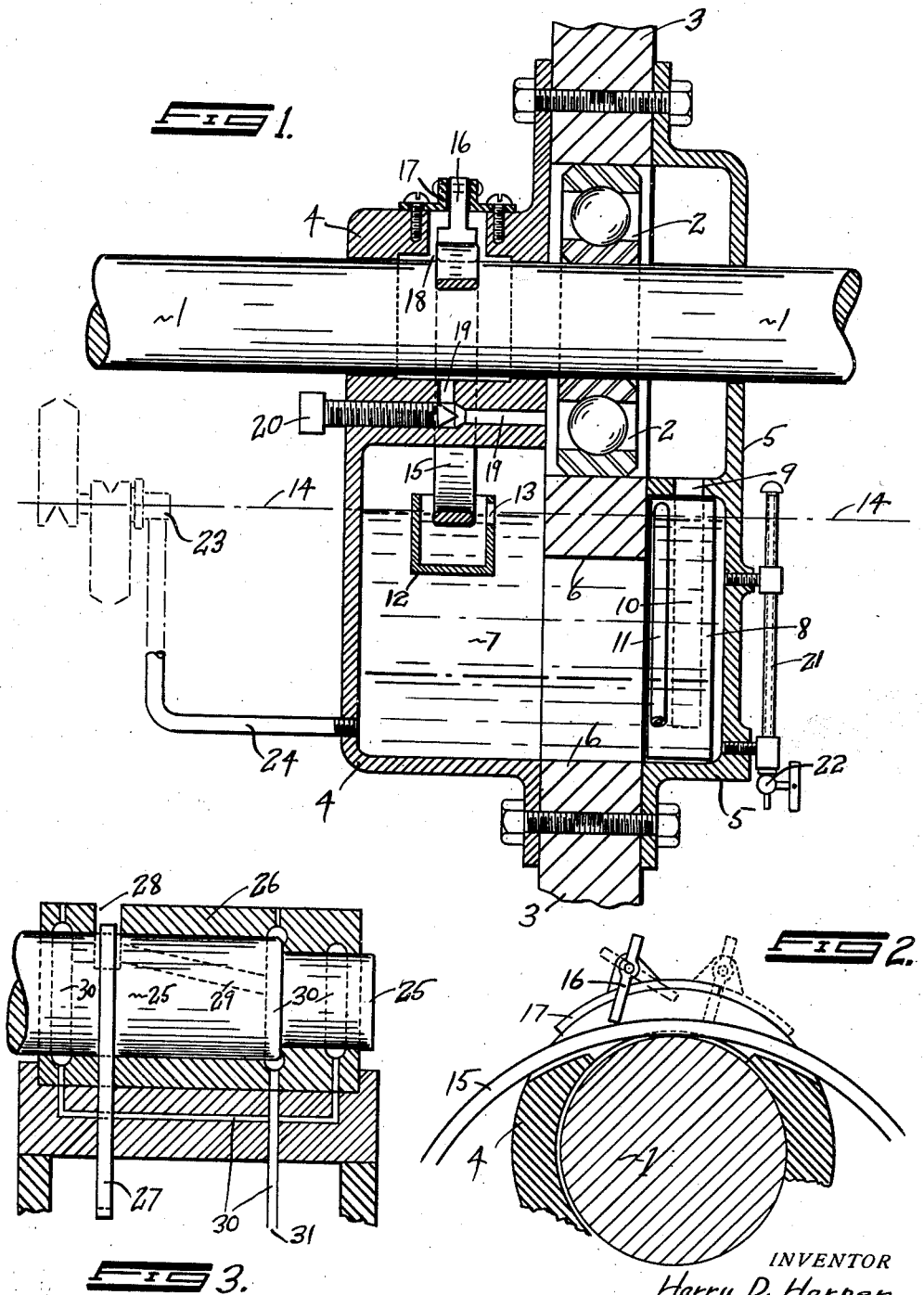
INVENTOR
Harry D. Harper,
BY
W D Harpman
ATTORNEY.

Patented Aug. 27, 1940

2,212,661

UNITED STATES PATENT OFFICE 2,212,661

BEARING LUBRICATION SYSTEM

Harry D. Harper, Youngstown, Ohio

Application December 10, 1937, Serial No. 179,139

1 Claim. (Cl. 308—128)

This invention relates to a bearing lubrication system.

The principal object of this invention is the provision of a bearing lubrication system designed to supply oil for lubricating purposes to a ball, roller, or friction type bearing.

A further object of this invention is the provision of a bearing lubrication system incorporating means for controlling the supply of lubrication to the bearing.

A further object of the invention is the provision of a bearing lubrication system with the provision for filtration and purification of the oil lubricant.

A further object is the provision of a bearing lubrication system utilizing an oil ring and equipped with means for controlling the oil introduced by the oil ring as well as the speed of the oil ring.

A further object of the invention is the provision of a bearing lubrication system incorporating both an oil sump and an oil containing ring trough designed in such manner that the lubricating oil is not subjected to severe agitation.

A still further object of the invention is the provision of a bearing lubrication system designed and also adapted to be used with an oil supply regulator such as that shown in my Patent No. 2,081,330, issued May 25, 1937, wherein an oil regulator is disclosed which will positively maintain a given oil level under any operating conditions.

The bearing lubrication system shown and described herein is the result of experimentation to determine a positive bearing lubrication means, the primary object being the control of lubricating oil supplied to the bearings in as much as various lubricating systems known to the art have no control means. The control means in this instance is adapted to control the amount of oil carried by the oil ring and indirectly the speed of the oil ring, thus preventing undesirable agitation in the oil and wear on the oil ring and its bearing surface. Through experimentation, it has been determined that the speed of the oil ring, and hence the supply of oil by the oil ring, is governed very largely by a fixed relationship and clearance between the ring and the sides and ends of its slot and the damming up of oil by the far end of the bearing slot adjacent to the oil ring, and by the positioning of a suitable barrier adjacent to the oil ring, together with the ability of the bearing to dissipate this oil supply.

In bringing the speed of the oil ring down to a normal desirable rate, it has been found that the use of a ring trough exerts some control, primarily due to the molecular action of the oil against the turning oil ring; and additional control being desirable, the positioning of a barrier adjacent to the oil ring, and preferably within or upon the bearing casing, will result in further reducing ring speed, and hence accurate control of the oil supply to the bearing.

Provision has been made for the removal of worn particles of the bearing carried from the bearing by the lubricating oil, as a filter unit has been designed and placed within the sump of the lubrication means and serves to suitably cleanse the lubricating oil being returned to the sump. The design of the filter, the sump, and the ring trough has been found to be highly important in that it is extremely desirable that the lubrication be supplied through a skimming action of the ring trough in relation to the sump of the device, and of the sump's skimming action in relation to the filter of the device.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:

Figure 1 is a side elevation, with parts in cross section, of a ball bearing, the bearing lubrication system being incorporated in the housing thereof.

Figure 2 is an end elevation, with parts in cross section, showing a section of the bearing shaft, showing in detail the barrier in position upon the oil ring.

Figure 3 is a side elevation, with parts in cross section, showing the adaption of the bearing lubrication system to a friction type bearing, the shaft, bearing, and oil ring being shown.

By referring to Figure 1 of the drawing it will be seen that a shaft 1 is carried by means of a ball bearing assembly 2 upon a bearing support 3. Formed around the ball assembly 2 and the adjacent portion of the shaft 1, there is a bearing lubrication system comprising a pair of oppositely disposed housings 4 and 5 which are in turn bolted to the bearing support 3. An opening 6 in the bearing support 3 forms a connection between the oppositely disposed housings 4 and 5, thus forming a sump 7 and space for a filter assembly 8, the filter assembly 8 being positioned in the right-hand portion of the sump 7 and directly below an opening 9 in the housing 5. A tube 10 is depended from the opening 9 and extends downwardly through the filter assembly 8, where the discharge from this depended tube 10 will be forced to find its way upwardly through the filter assembly 8, and out of the filter assembly 8 by means of a secondary tube 11, this tube 11 communicating with the upper end of the filter 8 and emptying into the lower portion of the sump 7. Positioned in the upper left-hand portion of the sump 7 is a ring trough 12 provided with an opening 13 slightly below the oil level which is indicated by the numeral 14. Functioning partially within this ring trough and over the shaft 1, an oil ring 15 serves as a means for carrying the lubricating oil upwardly to the bearing. Positioned on the upper surface of the housing 4 is an adjustable barrier 16 which has been designed to serve as a barrier to the oil carried upwardly by the oil ring 15, thus effectively controlling the amount of lubrication delivered at this point, and, as a direct result of the damming action of this lubricating oil, the speed of the oil ring 15 is controlled as well.

By referring to Figure 2, an end view, in cross section, of this particular barrier means is shown in enlarged detail, the barrier 16 being hinged and placed upon a slidably mounted bracket 17. This bracket 17 is slidably mounted by reason of parallel slots formed therein through which it is bolted to the housing 4 and is thereby adjustable as to its position. The dotted duplication of the barrier indicates the location of the barrier in the event that the shaft is revolving clockwise rather than counter-clockwise as the solid line views show.

Referring again to Figure 1 and the progress of the lubricating oil through the system, it will be apparent that lubricating oil deposited by the oil ring and barrier at a point 18 will be carried downwardly around the shaft 1 and through drilled openings 19 to the actual point of lubrication of the ball bearing assembly 2. A threaded screw adjusting means 20 is provided in connection with the drilled openings 19 in order to provide a manual control of the amount of lubricating oil being supplied through this passage.

Once the lubricating oil has emerged from the threaded openings 19 at a point adjacent to the ball bearing assembly 2, the normal flow of the lubricating oil will be across the lower portion of the ball bearing assembly 2 and thence downwardly through the opening 9 in the housing 5. From this point on, the cycle of the lubricating oil is repeated, and in as much as the flow must pass through the filter assembly 8, the lubricating oil will at all times be clean and available for further lubrication of the bearing.

Positioned on the housing 5 a suitable gauge is provided and comprises a section of glass tubing 21 in which the contents of the sump 7 will be visible and which serves as a visual indicator in the event that water enters the bearing and sump. A petcock 22 is provided at the lower extremity of the gauge and serves to drain away water, if and when necessary. The lubricating oil in the sump 7 of the device is intended to be supplied by a suitable oil regulator, such as my aforementioned Patent No. 2,081,330, and in Figure 1 this device is represented by a symbolic sketch indicated by numeral 23, the tube connecting the oil regulator to the sump 7 being indicated by the numeral 24.

By referring to Figure 3 it will be seen that a friction type bearing has been substituted for the ball bearing assembly as shown in Figure 1, and in Figure 3 a shaft 25 is shown in position in a bearing 26, and an oil ring 27 is shown in normal position upon this shaft 25. The barrier above mentioned is to be installed at a point 28, and the circulation of lubricating oil is insured across the bearing surface by means of a canal 29 in the bearing 26. Drainage rings and passageways 30 collect the lubricating oil and discharge it at a point 31 into the filter of the device. In lubricating the friction type bearing shown in Figure 3, the remainder of the device as shown in Figure 1 is utilized, the only modification being the manner in which the oil is directed to the actual bearing surfaces.

It is obvious that a plurality of these bearing lubrication systems may be supplied from a single oil regulator, and that due to the construction of the bearing lubrication system, the entrance of water into the device will not affect the lubrication of the bearing as the skimming action of the ring trough 12 will insure the bearing being supplied with lubricating oil despite the presence of water in the sump portion of the device. When the bearing lubrication system is used with an oil supply regulator such as shown and described in my afore-mentioned Patent No. 2,081,330, the regulator itself will continually remove water from the sump 7 and insure adequate lubrication at all times.

The obvious advantage of this lubrication system is that it insures an adequate supply of lubricating oil and provides visible indication means to determine the color of the lubricating oil. The visible indication of the oil color is highly important, as a foamy appearing oil indicates undesirable agitation and possible contamination with abrasive material. The bearing lubrication system is adjustable through the slidable barrier means to supply the exact amount of lubrication desired, thus insuring economical and satisfactory lubrication.

What I claim is:

In a bearing lubrication system adapted to lubricate a shaft rotating within a bearing, oppositely disposed housings positioned upon a bearing support, an oil ring trough positioned within one of the said oppositely disposed housings, an oil ring positioned upon the said shaft and having its lower extremity functioning within the said oil ring trough, barrier means formed on the said housing adjacent to the top portion of the said oil ring and adapted to control the oil delivered by the oil ring and regulate the speed of the oil ring, the said barrier means comprising a hinged barrier member pivoted to a bracket slidably positioned upon a portion of the said housing and adapted to dam up the oil flow on the said oil ring, a passage formed in the said housing adapted to permit the flow of oil across the bearing surfaces, a threaded adjustment screw positioned in the said passage adapted to provide manual regulation of the oil flow therethrough.

HARRY D. HARPER.